May 6, 1958  R. A. LARSEN ET AL  2,833,655
METHOD OF MAKING NON-CAKED INFESTATION-RESISTANT FLOUR
Filed Feb. 1, 1954
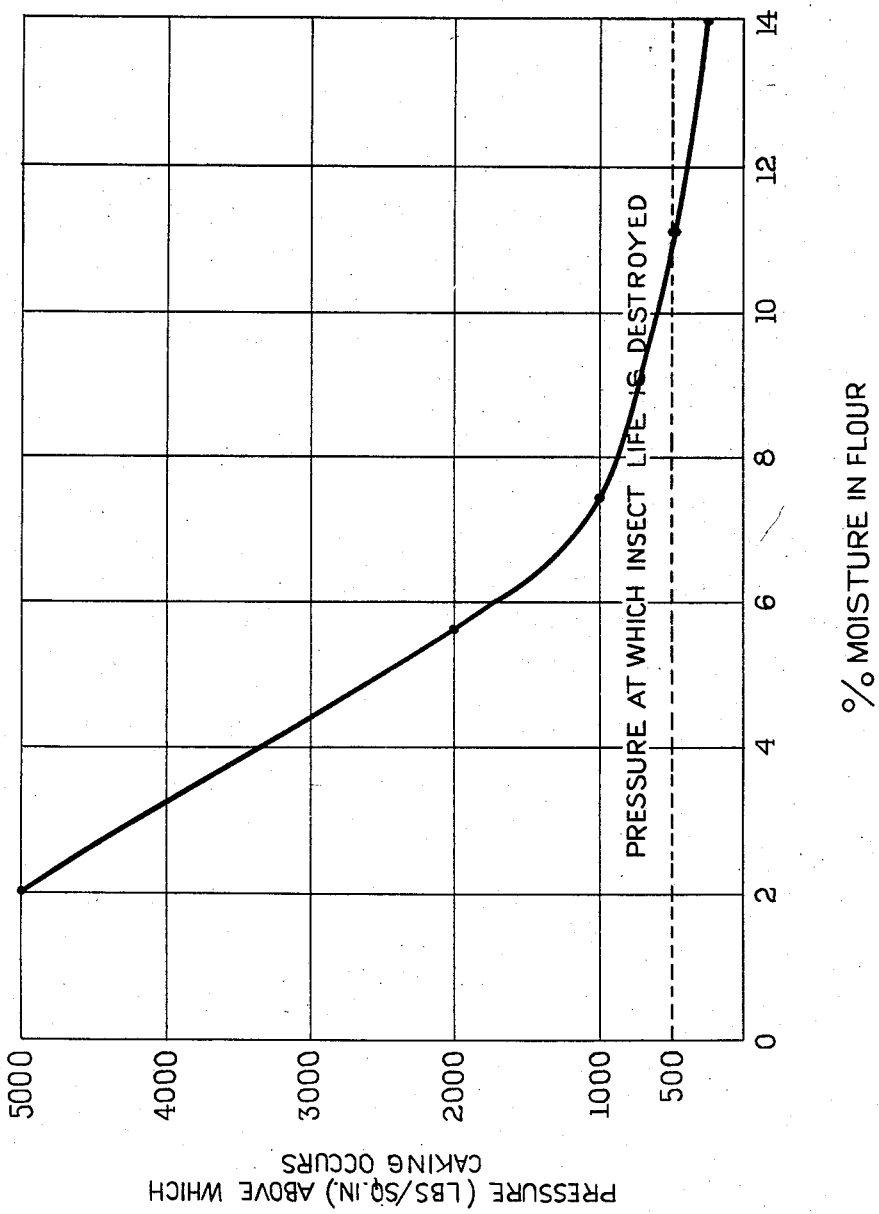
INVENTORS
Robert A. Larsen.
Samuel A. Matz.
BY
ATTORNEY 2,833,655

METHOD OF MAKING NON-CAKED INFESTATION-RESISTANT FLOUR

Robert A. Larsen, Minneapolis, Minn., and Samuel A. Matz, Chicago, Ill., assignors to the United States of America as represented by the Secretary of the Army Application February 1, 1954, Serial No. 407,619

2 Claims. (Cl. 99—153)

(Granted under Title 35, U. S. Code (1952), sec. 266)

The invention described herein, if patented, may be manufactured and used by or for the Government for governmental purposes, without the payment to us of any royalty thereon.

This invention relates to compressed dehydrated infestation-resistant flour.

The loss encountered by flour merchants and their customers by reason of insect infestation of flour runs into many millions of dollars annually. Flour heavily affected by insects is of course unfit for human consumption and, once infested, must be subjected to time and expense-consuming sifting, and unless freed from insect infestation, the flour is unmerchantable.

Numerous methods have been proposed for eliminating insect life from flour; however, insects are a hardy race and either remain unaffected by such processes, or even if temporarily eliminated tend to re-enter the flour after a relatively short time. The foregoing observation applies in an even higher degree to immature insect life, i. e., insect eggs and insect larvae which, once they are present in flour cannot be removed therefrom by any heretofore known mechanical or chemical process and therefore of necessity will fully develop into insects in the nutritive medium provided by the flour itself.

We have made the surprising discovery that flour is freed from insect life by subjecting it to a pressure of at least about 500 pounds per square inch. This pressure not only destroys fully developed insects but inflicts fatal injury to insect eggs and insect larvae, preventing their further development. A drawback of this method, originally encountered by us, namely caking of the flour (which makes the flour less merchantable and necessitates mechanical manipulation of the flour in order to reconvert it into powder form) at a pressure of 500 pounds per square inch or higher, has now been eliminated by us by subjecting the flour to a drying operation prior to compression; a table showing the relationship between moisture content of flour and caking under compression will be set forth in the following detailed description of our invention.

In addition to the primary object of our invention, namely to free flour from insect infestation, our invention also has other advantages such as reduction of both shipping weight and shipping space in transporting flour treated in accordance with our invention. The saving in shipping weight is of course equal to the reduction of the moisture content of the flour; the saving in shipping space amounts to 45% or more if the flour is maintained in a state of compression during the shipping. As already pointed out the flour does not cake if treated in accordance with our invention.

The accompanying drawing shows a diagram which correlates the moisture content of flour at various degrees of dehydration and the amount of pressure to which such flour can be subjected without substantial caking. In accordance with the values set forth on that diagram, flour dried to a moisture content of about 11.1% and subjected to a pressure of about 500 pounds per square inch, which pressure destroys all insect life in flour even in its incipient stages (eggs larvae), does not cake.

The same diagram can also be expressed in tabular form:

Table I

| Flour Moisture, Percent | Pressure Above Which Caking Appears, Lbs./sq. in. |
| --- | --- |
| 2.0 | 5,000 |
| 5.8 | 2,000 |
| 7.5 | 1,000 |
| 11.1 | 500 |
| 14.0 | 300 |

100 g. Samples.

The ordinary moisture content of flour is about 14%. We have found that if ordinary flour not preliminarily dried, is subjected to a pressure of about 300 pounds per square inch (which is the upper limit of compression to which flour of 14% moisture content can be subjected without caking), most fully developed insect life in the flour is destroyed; however, a certain number of eggs and larvae will survive this pressure and will be able to develop into full grown insects once the pressure is released. At pressures between 300 and 500 pounds per square inch and corresponding reduction of moisture content of the flour in accordance with the appended diagram, in order to prevent caking, the percentage of insect life destroyed increases until at 500 pounds per square inch the destruction becomes complete. At this pressure of about 500 pounds per square inch which necessitates pre-drying of the flour to a moisture content of not more than about 11.1%, the insect eggs and insect larvae are fatally injured and lose their capacity for further development even after the pressure is released. Higher pressures and greater amounts of moisture reduction in accordance with the values established by the above table and appended diagram can be used, especially when it is desired to reduce shipping weight and shipping volume to the maximum practicable extent. Thus, compression of the flour at a pressure of about 1000 pounds per square inch necessitates drying of the flour to a moisture content not exceeding about 7.5%; this reduces the shipping weight by about 6.5%, the shipping volume by about 48–49%, without caking, in addition to eliminating all incipient and full developed insect life from the flour. However, for most practical purposes a combined moisture reduction to about 11% and compression at about 500 pounds per square inch, will probably be the most economical approach; when so treated, the flour is not only freed from incipient and fully developed insect life, without caking, but its shipping weight is also reduced by about 3%, and shipping volume by about 45% (if the flour is shipped in a state of compression).

Flour treated in accordance with our invention need not be maintained in a state of compression after the application of the pressure has taken place; however, in order to prevent re-infestation of the flour by insects, it is necessary to package the flour in insect resistant packaging material, or otherwise protect it from re-infestation, e. g. by storage in a fumigated space. Many suitable insect resistant packaging materials are available, such as steel drums, paper bags specially treated to impart insect resistance thereto, tightly closed glass jars, etc.

Reduction of the moisture content of the flour can be accomplished by a large variety of known drying processes; subjection to a current of hot dry air may be mentioned by way of example. Compression can be accomplished by commercial presses used for compressing powdered material.

Having thus described the principle of our invention and several ways of putting the same into practice, we wish it to be understood that we claim our invention broadly within the limits of our appended claims.

We claim:

1. Method of preparing ordinary flour for shipment at materially reduced shipping weight and volume by drying and compression under controlled conditions so as to avoid caking of said flour, and simultaneously freeing said flour from insect infestation, said method comprising drying said flour to a moisture content not exceeding about 7.5%, and applying to said dried flour a pressure of at least about 500 pounds per sq. in. but not in excess of the value represented by the curve shown in the drawing for the moisture content at which compression is effected.

2. Method according to claim 1, wherein said moisture content is between about 7.5% and about 2% and said pressure is at least about 1000 pounds per sq. in.

References Cited in the file of this patent

UNITED STATES PATENTS

| | | |
|---|---|---|
| 136,306 | Chichester | Feb. 25, 1873 |
| 388,962 | Gaff | Sept. 4, 1888 |
| 1,452,871 | Dienst | Apr. 24, 1923 |

FOREIGN PATENTS

| | | |
|---|---|---|
| 95 | Great Britain | 1856 |
| 114,122 | Australia | Oct. 27, 1941 |

OTHER REFERENCES

"The Chemistry and Technology of Food and Food Products," 1944, by M. B. Jacobs, published by Interscience Publishers, Inc. (New York), vol. I, pages 629–630 (Tables 126 and 128 relied on).

"Manufacture of Compressed Tablets," by Silver et al.; copyright 1944, F. J. Stokes Machine Co., pages 5 to 7 relied on.